US011332233B2

(12) United States Patent
Gibbert et al.

(10) Patent No.: US 11,332,233 B2
(45) Date of Patent: May 17, 2022

(54) SYSTEM FOR DRIVING A FLAP ARRANGEMENT BETWEEN A RETRACTED POSITION AND AN EXTENDED POSITION

(71) Applicant: Airbus Operations GmbH, Hamburg (DE)

(72) Inventors: Markus Gibbert, Hamburg (DE); Blazenko Coskovic, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 342 days.

(21) Appl. No.: 16/452,876

(22) Filed: Jun. 26, 2019

(65) Prior Publication Data

US 2020/0017192 A1 Jan. 16, 2020

(30) Foreign Application Priority Data

Jul. 16, 2018 (DE) .......................... 102018117095.5

(51) Int. Cl.
*B64C 9/02* (2006.01)
*B64C 9/24* (2006.01)

(52) U.S. Cl.
CPC . *B64C 9/02* (2013.01); *B64C 9/24* (2013.01)

(58) Field of Classification Search
CPC .... B64C 9/02; B64C 9/04; B64C 9/24; B64C 9/26
See application file for complete search history.

(56) References Cited

U.S. PATENT DOCUMENTS

| 3,504,870 A | * | 4/1970 | Weiland | .................... B64C 9/24 244/210 |
| 4,189,121 A | * | 2/1980 | Harper | ....................... B64C 9/24 244/214 |
| 4,202,519 A |   | 5/1980 | Fletcher | |

(Continued)

FOREIGN PATENT DOCUMENTS

| DE | 2059926 A1 | 6/1972 |
| DE | 102011014687 A1 | 9/2012 |

(Continued)

OTHER PUBLICATIONS

German Search Report; priority document.
European Search Report for corresponding European Patent Application No. 19182774.0 dated Nov. 29, 2019.

*Primary Examiner* — Philip J Bonzell
(74) *Attorney, Agent, or Firm* — Greer, Burns & Crain, Ltd.

(57) ABSTRACT

A flap system driving a leading-edge flap between retracted and extended positions comprises a leading-edge flap, an actuator, first, second and third fixed links, first and second connecting links, and an auxiliary link. The first, second and third fixed links are rotatably supported on respective first, second and third structurally fixed points by respective first, second and third support joints. The first fixed link couples with an end of the first connecting link, which is coupled with a first flap joint at another end. The second fixed link rotatably couples with a central region of the first connecting link. The third fixed link rotatably couples with an end of the second connecting link, which is coupled with a second flap joint at another end. The second connecting link couples with the first fixed link through the auxiliary link, each at positions inside of the respective ends.

13 Claims, 7 Drawing Sheets

(56) References Cited

U.S. PATENT DOCUMENTS

| | | | |
|---|---|---|---|
| 5,158,252 A | 10/1992 | Sakurai | |
| 7,264,206 B2 * | 9/2007 | Wheaton | B64C 9/24 244/214 |
| 7,578,484 B2 | 8/2009 | Fox et al. | |
| 7,828,250 B2 * | 11/2010 | Wheaton | B64C 7/02 244/214 |
| 7,992,826 B2 * | 8/2011 | Wheaton | B64C 9/24 244/214 |
| 8,596,586 B2 | 12/2013 | Schroeder | |
| 9,016,637 B2 * | 4/2015 | Sakurai | B64C 9/24 244/214 |
| 9,365,284 B2 * | 6/2016 | Sakurai | B64C 9/22 |
| 9,656,739 B2 | 5/2017 | Hue et al. | |
| 9,688,386 B2 * | 6/2017 | Sakurai | B64C 9/22 |
| 10,124,881 B2 | 11/2018 | Schlipf et al. | |
| 10,207,791 B2 * | 2/2019 | Johnson | B64C 9/34 |
| 10,618,644 B2 * | 4/2020 | Gemilang | B64C 13/30 |
| 10,829,198 B2 * | 11/2020 | Clark | B64C 9/24 |
| 2006/0102803 A1 | 5/2006 | Wheaton et al. | |
| 2010/0025537 A1 * | 2/2010 | Wheaton | B64C 9/22 244/214 |
| 2011/0024575 A1 * | 2/2011 | Wheaton | B64C 9/24 244/214 |
| 2013/0206917 A1 * | 8/2013 | Sakurai | B64C 9/24 244/214 |
| 2014/0312175 A1 | 10/2014 | Sakurai et al. | |
| 2016/0297513 A1 * | 10/2016 | Sakurai | B64C 9/02 |
| 2017/0320566 A1 * | 11/2017 | Gemilang | B64C 9/26 |
| 2018/0370614 A1 * | 12/2018 | Clark | B64C 23/06 |
| 2018/0370615 A1 * | 12/2018 | Johnson | B64C 9/34 |

FOREIGN PATENT DOCUMENTS

| | | |
|---|---|---|
| DE | 102011018906 A1 | 10/2012 |
| EP | 2509859 B1 | 5/2014 |
| EP | 2796365 A2 | 10/2014 |
| WO | 2008051286 A2 | 5/2008 |

* cited by examiner

SYSTEM FOR DRIVING A FLAP ARRANGEMENT BETWEEN A RETRACTED POSITION AND AN EXTENDED POSITION

CROSS-REFERENCES TO RELATED APPLICATIONS

This application claims the benefit of the German patent application No. 102018117095.5 filed on Jul. 16, 2018, the entire disclosures of which are incorporated herein by way of reference.

FIELD OF THE INVENTION

The invention relates to a system for driving a flap arrangement between a retracted position and an extended position, a wing having such a system as well as an aircraft.

BACKGROUND OF THE INVENTION

In commercial aircraft, often so-called high lift systems are provided on a wing permitting an increase of a lift generating area of the wing as well as its camber. Predominantly, these high lift systems comprise a trailing edge flap arrangement and a leading-edge flap arrangement. For example, a leading-edge flap arrangement comprises a flap that is extended from a recess at an underside of the wing into a position upstream of the wing. For this so-called Krüger flap, numerous different actuation mechanisms exist.

A Krüger flap is usually stored at an underside of the wing with the trailing edge pointing in a forward direction and the leading edge pointing backwards. During the deployment of the flap, it roughly follows a rotary motion to reach a position in front of a leading edge of the wing under creation of a gap thereto, wherein the leading edge of the flap points in the flight direction and wherein the trailing edge points in a rearward direction.

DE102011018906A1 exemplarily shows a leading-edge flap system with a Krüger flap. Here, an additional holding element is attached to a trailing edge of the flap to influence the gap between the flap and the leading edge of the wing.

EP2509859B1 shows a high lift system, which may also comprise a Krüger flap, which has a certain design to shape the resulting gap between the flap and the leading edge of the wing to be strictly convergent.

SUMMARY OF THE INVENTION

Common kinematics for extending leading-edge slats in the form of Krüger flaps often provide a strict motion of the leading-edge flap attached to a lever, which swivels around a rotational axis. Hence, the angle between a chord axis of the flap and a chord axis of the wing is substantially proportional to the position of the lever. It may, however, be advantageous to provide a different motion to optimize a gap between the leading-edge flap and the leading edge of the wing as well as the air flow over the flap and the wing.

Therefore, it is an object of the invention to propose an improved flap system for providing a motion of a leading-edge flap, which improves the flow in the flap region, while the system shall be as simple as possible.

A flap system for driving a leading-edge flap between a retracted position and an extended position is proposed, the system comprising a leading-edge flap, an actuator, a first fixed link, a second fixed link, a third fixed link, a first connecting link, a second connecting link and an auxiliary link, wherein the first fixed link comprises a first support joint for rotatably supporting the first fixed link on a first structurally fixed point, wherein the second fixed link comprises a second support joint for rotatably supporting the second fixed link on a second structurally fixed point, wherein the third fixed link comprises a third support joint for rotatably supporting the third fixed link on a third structurally fixed point, wherein the first fixed link comprises a first connecting joint coupled with an end of the first connecting link, which is coupled with a first flap joint at another end, wherein the second fixed link comprises a second connecting joint rotatably coupled with a central region of the first connecting link, wherein the third fixed link comprises a third connecting joint rotatably coupled with an end of the second connecting link, which is coupled with a second flap joint at another end, wherein the actuator, second connecting link is coupled with the first fixed link through the auxiliary link, each at positions inside of the respective ends, and wherein the fixed links, the connecting links and the auxiliary link are arranged to actively place the leading-edge slat from a retracted position into an extended position.

With the flap system according to the invention it is possible to reach certain aerodynamic flap positions, which are responsible for more high lift performance. The major advantage lies in that up to an intermediate position with an approximate deployment angle of 117° measured between the local wing chord and the leading-edge flap chord the trailing edge of the Krüger flap stays below the wing leading edge point. The gap between the trailing edge of the flap and the wing leading edge may also be 2% of the local wing chord or less. This prevents a flow separation on the main wing during the deployment of the Krüger flap. In a subsequent motion, the extended position can be reached, which may comprise an angle between the local flap chord and the local wing chord of approximately 130°, while the size of the gap is maintained. Altogether, the flap system according to the invention is able to provide a more complex motion of the leading-edge flap that optimizes the flow at least in the leading-edge region. A direct coupling of an angle adjustment and the deployment state of the flap is eliminated.

The arrangement of links coupled with three structurally fixed points will change the angle between the flap and the wing chord up to a certain state. Afterwards, the flap angle may remain substantially constant or may only increase slightly. This means that a desired deployment angle of the flap may almost be reached in an intermediate position before the flap is completely deployed and is still under the local wing chord. After that, the flap may provide a substantially translational motion, i.e., in a subsequent substantially parallel motion course.

The leading-edge flap may be a flow body having an elongate shape as well as a leading edge and a trailing edge. It may be curved in a similar way to a common Krüger flap or another type of flow influencing control surface of an aircraft. The main flap is a leading-edge flap intended to be moved relative to a leading edge of a wing. In a retracted state, the flap is arranged in a recess at an underside of the wing when the flap system is installed in a wing. The motion mentioned in this application relates to a deployment motion from the recess into a position forward the leading edge of the wing.

The flap system according to the invention is based on an arrangement of six links in a first embodiment. Three fixed links are rotatably supportable on three individual structurally fixed points. Two connecting links are rotatably supported on two individual flap joints, which are arranged at a distance to each other on the leading-edge flap. By the interconnection of the fixed links and the connecting links, which also includes the use of an auxiliary link, the spatial positions of the flap joints and thus of the flap are determined. For driving the arrangement of links, the actuator may be coupled with one of the fixed links. In the following, the components are described in more detail.

The actuator may be a rotary actuator, which is exemplarily directly coupled with one of the fixed links. The actuator may also be coupled with a structurally fixed point in an installed state on the wing. By rotating the actuator, the respective fixed link is rotated around the respective structurally fixed point and thereby moves all links directly or indirectly coupled thereto.

The first fixed link and the second fixed link each comprise an end that is rotatably supported on an individual structurally fixed point and an opposed end that is rotatably coupled with the first connecting link. By swiveling the first and second fixed links around their respective support joints, which are coupled with structurally fixed points in an installed state, the first connecting link is urged into a motion that is determined by the positions of the first and second structurally fixed points, the lengths of the first and second fixed links as well as the coupling positions on the first connecting link.

Exemplarily, the first connecting link may be divided into two halves along its main extension. At an outer end of one half, the first connecting link is coupled with the first flap joint. At the other half, it may be coupled to the first and second fixed links. It may be preferred to couple the first fixed link with an outer end of the first connecting link, while the second fixed link is coupled with a position on the first connecting link that is shifted towards the center of the first connecting link. In a retracted position, the first and second fixed links may be arranged substantially parallel to each other, while the first fixed link may comprise a greater length than the second fixed link. Hence, the first connecting link is clearly inclined to the first and second fixed links in the retracted position. As a result, in a first section of the deployment course, the first connecting link will maintain its orientation and the outer end of the first connecting link thereby moves along a substantially circular path.

Depending on the length relationship of the first and second fixed links, as well as the positions of the first and second structurally fixed points, the orientation of the first connecting link will change along the deployment course, such that the radius of the motion path of the outer end of the first connecting link more and more decreases after the first section of the deployment course.

At the same time, the third fixed link as well as the auxiliary link urge the second connecting link into a certain motion. While the auxiliary link moves directly depending on the first fixed link, the auxiliary link and the third fixed link determine the orientation of the second connecting link. It may be preferred to let the second flap joint conduct a motion similar to the first flap joint, i.e., conducting a rotary motion with a radius that decreases after following the first section of deployment. Consequently, the flap system according to the invention may be adjusted in such a way that a leading edge of the flap is in a relatively far forward position even with the trailing edge of the flap being underneath a chord line of the wing, to which the flap system is attachable. The leading-edge flap will preferably assume an angle of about 117° to the wing chord with the trailing edge of the flap still being underneath the chord line, after which a primarily parallel or translational motion is conducted. This may lead to an angle of approximately 130°. Hereby, a certain gap is maintained between the flap and the leading edge of the wing.

In a preferred embodiment, the first fixed link has a length greater than the second fixed link. This enables the flap system according to the invention to provide a certain motion course of the first flap joint as explained above. The difference in lengths will lead to a clear change in the orientation of the first connecting link at a certain state of deployment.

Preferably, in the retracted position, the first fixed link and the second fixed link enclose an angle of less than 10°. Hence, in this position or deployment state, the first fixed link and the second fixed link are arranged substantially parallel to each other. This leads to the motion of the first connecting link to follow a substantially circular path, until the orientation of the first connecting link more strongly changes, such that the first flap joint conducts a motion with decreasing radius. Consequently, the motion of the first flap joint is spirally as a tendency.

In the retracted position, the first connecting link and the first fixed link enclose an angle in a range of 25° to 45°. The first connecting link is coupled with an end of the first fixed link, which is opposed to the first structurally fixed point. For reaching the above described motion, it is preferred that the end of the first connecting link and the first fixed link are in a most rearward position, when the flap is retracted. Consequently, the first connecting link is oriented slightly forward. During the deployment, depending on the size of the second fixed link, the angle enclosed by the first fixed link and the first connecting link in the fully extended position may be substantially the same.

Preferably, the third fixed link has a length that is half the length of the first fixed link at a maximum. Due to a preferably forward location of the third fixed link, an end opposed to the third support joint only needs to conduct a motion with a comparably small radius. Hence, a smaller length is required. In this regard it is stated that the second connecting link, as well as the auxiliary link, may comprise a length that is comparable to the length of the third fixed link and, particularly, half the length of the first fixed link at a maximum.

Preferably, the fixed links, the connecting links and the auxiliary link are arranged to actively place the leading-edge flap from a retracted position into an intermediate position, in which a chord axis of the flap is adjusted to a desired angle, and to provide a translational motion afterwards along the chord axis of the flap, while the orientation of the chord axis substantially remains constant. Hence, all of the links used in the flap system are to be designed in a manner, that this behavior can be achieved. The orientation of the chord axis of the flap should thereby remain constant. Since the kinematical chain relies on rotational motions it may be sufficient to let the orientation of the chord axis of the flap to vary in a range of ±2°. Hence, the flap as presented in the above description will be moved to a forward position, in which the chord has assumed a desired angle just before the chord axis of the wing is reached. Afterwards, the flap may be moved substantially translational along the chord axis with a certain gap between the leading edge of the wing and the leading edge flap.

In an advantageous embodiment, the leading-edge flap comprises a body part and a nose part, wherein the system further comprises a third connecting link, a second auxiliary link and a fourth connecting link, wherein the second connecting link is coupled with an end of the third connecting link, wherein the third connecting link is coupled with the second auxiliary link at an opposed end, wherein a center region of the second auxiliary link is swivably supported on the first flap joint and is coupled with the third connecting link at one end and the fourth connecting link at an opposed end, and wherein the flap nose is coupled with the fourth connecting link and the first flap joint. Hence, the leading edge flap is divided into two parts, which are movable relative to each other. They may exemplarily be coupled through a hinge. This allows the flap to be stored at an underside of the wing easily, as the flap nose can be folded into the direction of the flap body. In order to unfold the flap nose, the set of third connection link, fourth connecting link and second auxiliary link are provided. The third connecting link transfers a motion from the first connecting link to the second auxiliary link, which is preferably designed as a rocker. Consequently, when the third connecting link is pushed towards the first flap joint, the nose part of the flap is pulled towards the first flap joint. This leads to a compacting/folding of the flap in the retracted position. Consequently, the third connecting link is to be dimensioned such that the distance between the attachment point of the third connecting link and the respective end of the third connecting link that points to the nose part exceeds the distance to the first flap joint. During the extension motion, the third connecting link is pulled to the second flap joint and beyond, such that the second auxiliary link rotates to push the nose part outwardly.

Also, exclusively a single actuator may be used. Hence, the advantages of the flap system can be achieved by moving only one of the links without having to utilize a second actuator for, e.g., changing an angle or translational position of the flap in relation to the wing, to which the flap system is installed. The flap system according to the invention is simple, yet efficient to provide the desired motion of the flap.

Preferably, the actuator, the fixed links, the connecting links and the auxiliary link are arranged to actively place the leading-edge slat from a retracted position into an intermediate position, in which a chord axis of the flap is adjusted to a desired angle, and to provide a substantially translational motion afterwards along the chord axis of the flap, while the orientation of the chord axis substantially remains constant or increases slightly, for example about 10-15°. Hence, all of the links used in the flap system are to be designed in a manner, that this behavior can be achieved. Hence, the flap as presented in the above description will be moved to a forward position, in which the local flap chord has assumed a desired angle just before the local chord axis of the wing is reached. Afterwards, the flap may be moved substantially translational along the chord axis with a certain gap between the leading edge of the wing and the leading edge flap into the fully extended position.

As stated further below, the certain angle in the intermediate position may be approximately 117°. In the extended position the angle may be approximately 130°. However, these angles may vary slightly depending on the design of the aircraft, for example about +/−2°.

The invention further relates to a wing having a leading-edge region and a trailing edge region as well as at least one flap system according to the above description.

Advantageously, the system is arranged in the leading-edge region.

Preferably, the flap system is designed to move the flap below a wing leading edge point up to an angle of 117° between a local flap chord and a local wing chord. This prevents a flow separation on an upper side of the wing. The position of the flap just below the wing leading edge point is considered the intermediate position mentioned above and further below.

In the subsequent extension from the intermediate to the extended position, the local flap chord reaches an angle of exemplarily 130° to the local wing chord. The flap then has moved in a substantially translational motion along the leading edge of the wing under maintaining the gap.

The flap system is further designed to limit a gap between a trailing edge of the flap and a leading-edge point of the wing to 2% of the local wing chord. This harmonizes a flow from the flap to an upper side of the wing. The gap between the trailing edge of the flap and the wing leading edge should not be greater than 2% of local wing chord. This prevents a flow separation on the wing during the deployment of the flap. This may include the intermediate position. Also, this may include the extended position.

Finally, the invention relates to an aircraft having at least one such wing.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF THE PREFERRED EMBODIMENTS

Figure 1:
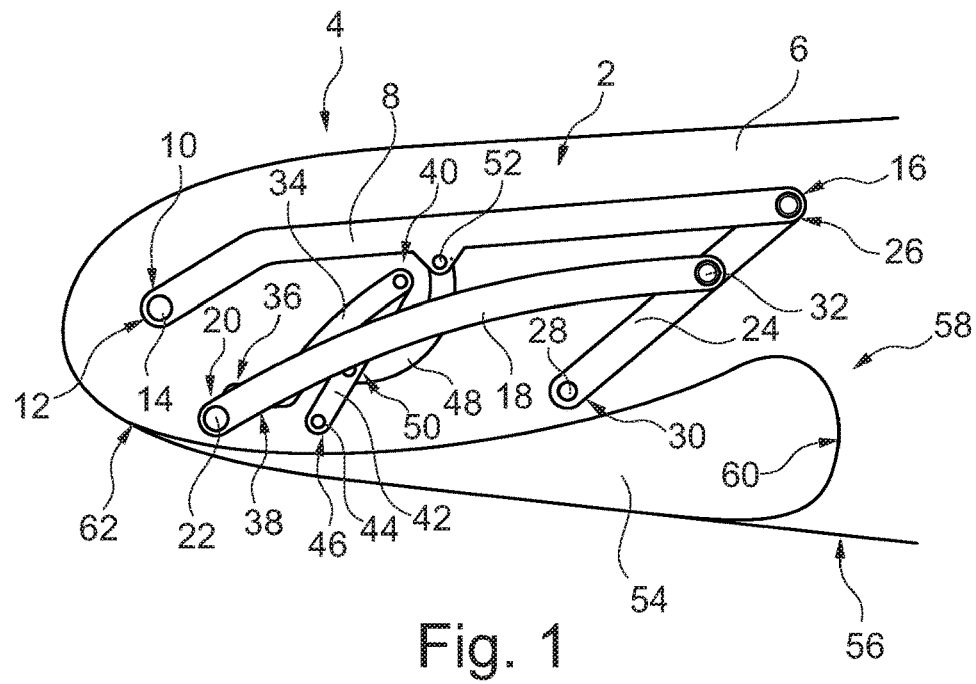
FIG. 1 shows a first exemplary embodiment of a flap system according to the invention in a side view, with the flap in the closed position.

FIG. 1 shows a flap system 2 installed in a leading-edge region 4 of a wing 6. The flap system 2 comprises a first fixed link 8, which is swivably or rotatably mounted on a first structurally fixed point 10. For example, an inner end 12 of the first fixed link 8 comprises a first support joint 14, which is connected to the first structurally fixed point 10 of the wing 6. The first fixed link 8 further comprises an outer end 16, which is opposed to the inner end 12. The term "outer end" is to be understood as the end, which is outside of the contour of the wing 6 in an extended position. In FIG. 1, a retracted position is shown. Here, the first fixed link 8 exemplarily extends along a substantially horizontal axis from leading-edge region 4 further inwards.

The flap system 2 further comprises a second fixed link 18, which is swivably or rotatably mounted on a second structurally fixed point 20. For this purpose, the second fixed link 18 comprises a second support joint 22. In the retracted position, the second fixed link 18 extends from the leading-edge region 4 further inwards. In this position, the first fixed link 8 and the second fixed link 18 exemplarily enclose an angle of approximately 10°, which may also differ up to 10-15°. The first structurally fixed point 10 is slightly forward and above of the second structurally fixed point 20. The second fixed link 18 comprises a length below the length of the first fixed link 8.

The flap system 2 furthermore comprises a first connecting link 24, which at one end 26 is coupled with the end 16 of the first fixed link 8 and with a first flap joint 28 at an opposed end 30. The first connecting link 24 further comprises an intermediate joint 32, which in turn is coupled with the second fixed link 18 at an end opposed to the first support joint 20.

On moving the first fixed link 8 and the second fixed link 18, the first connecting link 24 is urged into a motion. This determines the motion of the first flap joint 30. Due to the orientation in the retracted position, as well as the relation of the first fixed link 8 and the second fixed link 18, the first flap joint 30 will conduct a rotary motion with a radius that decreases from a certain stage of deployment.

Still further, the flap system 2 comprises a third fixed link 34, which is rotatably or swivably supported on a third structurally fixed point 36 by means of a third support joint 38. An end 40 opposed to the third support joint 38 is coupled with a second connecting link 42, which in turn is coupled with a second flap joint 44 at an end 46 of the second connecting link 42. Between the ends 40 and 44 of the second connecting link 42 an intermediate joint 50 is positioned, to which an auxiliary link 48 is coupled. An opposed end of the auxiliary link 48 is coupled with the first fixed link 8 at an auxiliary link joint 52, which is placed between the first support joint 14 and the outer end 16. Consequently, the second connecting link 42 is set into motion due to being coupled with the third fixed link 34. In relation to the intermediate joint 50, the second connecting link 42 acts in a rocker-like manner, such that the second flap joint 46 follows a swiveling motion induced by the third fixed link 34. In addition to this, the intermediate link 50 is moved through the action of the first fixed link 8. The third fixed link 34, the second connecting link 42 as well as the auxiliary link 48 comprise a length that is substantially in the same order of magnitude. However, due to the compactness of the arrangement of these three links, the auxiliary link 48 has a curved shape. Additionally, the third fixed link 34 comprises an L or J shape.

The deployment of the flap joints 30 and 46 leads to a motion of a leading-edge flap 54, which carries the flap joints 30 and 46. As stated above, in FIG. 1 the retracted position of the flap 54 is demonstrated. Here, the flap 54 is arranged at an underside 56 of the wing in a recess 58. Here, a leading edge 60 of the flap 54 is in a rearward position, while a trailing edge 62 is arranged in a forward position. The flap 54 closes the recess 58 in order to produce a harmonic outer surface.

Figure 2:
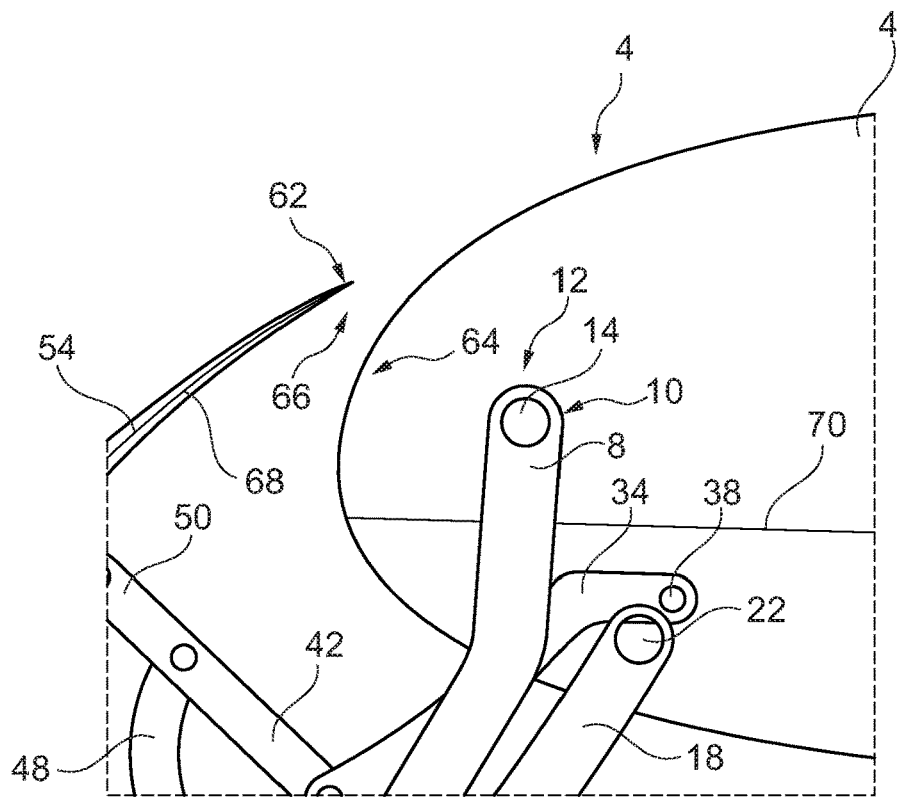
FIG. 2 shows a partial side view of the flap system of FIG. 1 in an extended position.
Figure 3:
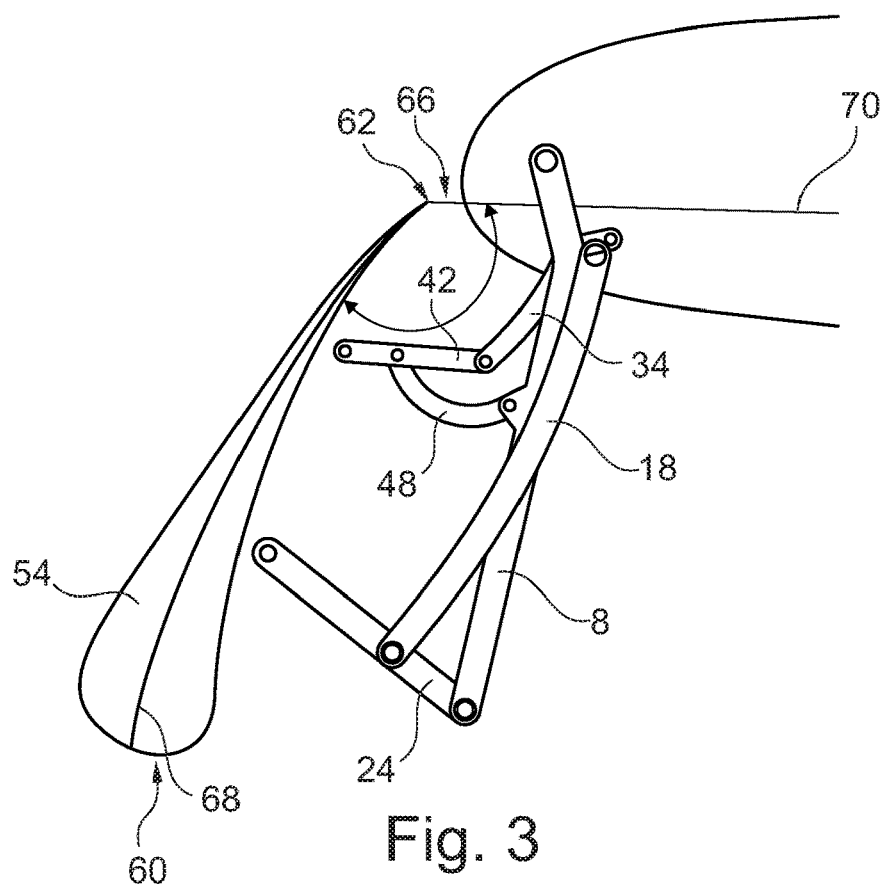
FIG. 3 shows a full side view of the flap system of FIG. 1 in a partially extended position.
Figure 4:
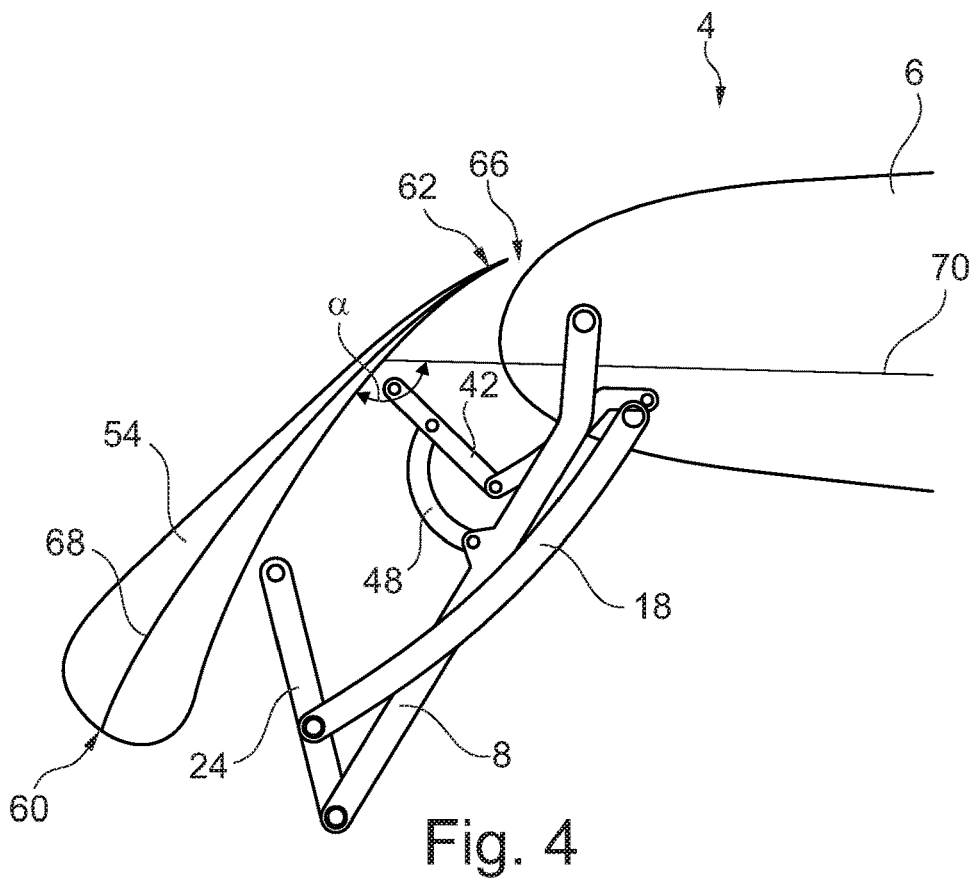
FIG. 4 shows a full side view of the flap system of FIG. 1 in an extended position.

In the FIGS. 2 to 4, other deployment stages of the flap 54 are shown. FIG. 2 corresponds to FIG. 4 and shows a detail between the trailing edge 62 and a leading edge 64 of the wing 6. Here, the trailing edge 62 of the flap 54 produces a gap 66, which should not exceed 2% of the local wing chord. Here, the flap 54 is in an extended position.

In FIG. 3, an intermediate position of the flap 54 is shown. Here, a local flap chord 68 and a local wing chord 70 enclose an angle α of approximately 117°, wherein the trailing edge 62 of the flap 54 is just below the wing chord 70. Directly afterwards, the flap 54 provides a substantially parallel motion and only slightly changes the angle α to approximately 130°.

Figure 5:
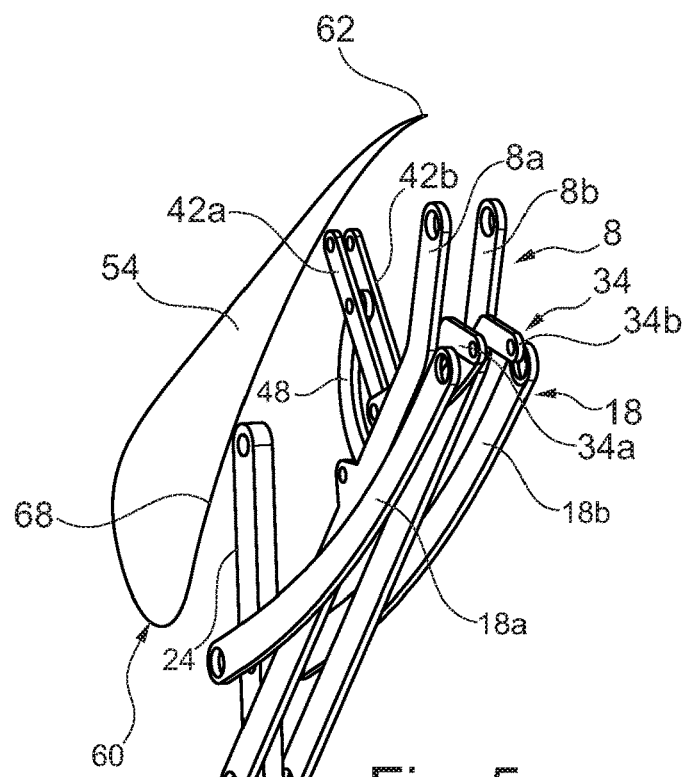
FIG. 5 shows a rear perspective view of the flap system of FIG. 1.
Figure 6:
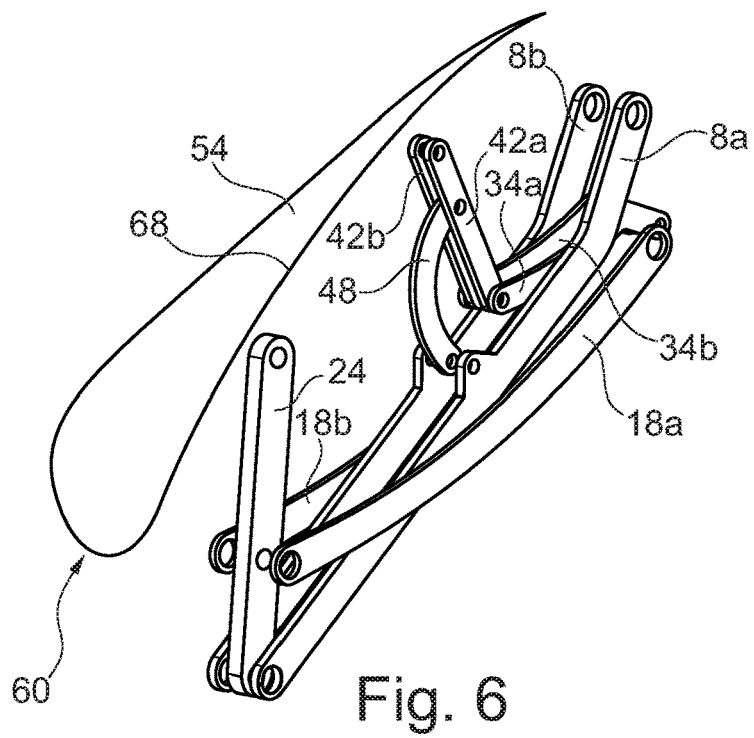
FIG. 6 shows a front perspective view of the flap system of FIG. 1.

FIG. 5 shows the setup of the flap system 2 in a three-dimensional view. Here, it is apparent that the first connecting link 24 and the auxiliary link 48 are the only components that are designed as single bodies. Since the links 8, 18, 24, 34, 42 and 48 cross each other during the deployment motion, the remaining links 8, 18, 34 are provided as doubled and symmetrically arranged links. Consequently, the first fixed link 8 is made of two first fixed sub-links 8*a* and 8*b*. The second fixed link 18 is realized in the form of two second fixed sub-links 18*a* and 18*b*. The same applies to the second connecting link 42, which comprises two sub-links 42*a* and 42*b*. These are also shown in FIG. 6 in another perspective.

FIGS. 7 to 12 show a modified flap system 72, which comprises additional components. These include a different design of a flap 73 in form of a body part 74 and a nose part 76. The second connecting link 42 is additionally coupled with a third connecting link 78, which extends from the second connecting link 42 to a second auxiliary link 80, which is swivably supported around a central joint 82 on a first flap joint bracket 84. Two ends 86 and 88 of the second auxiliary link 80 swivel around the joint 82. A fourth connecting link 90 is coupled with the second auxiliary link 80 and is attached to a nose joint 92 arranged on the nose part 76. Hence, the second auxiliary link 80 is urged into motion by the third connecting link 78 and thereby pulls the nose part 76 or pushes it outwardly.

Figure 7:
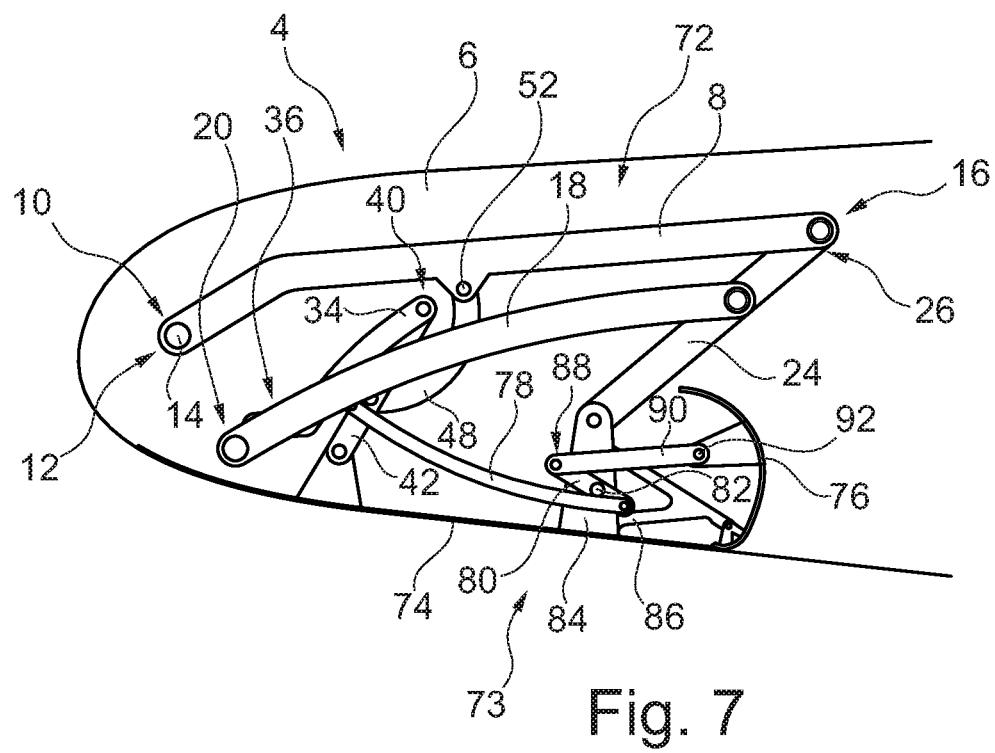
FIG. 7 shows a second exemplary embodiment of a flap system according to the invention in a side view, with the flap in the closed position.
Figure 8:
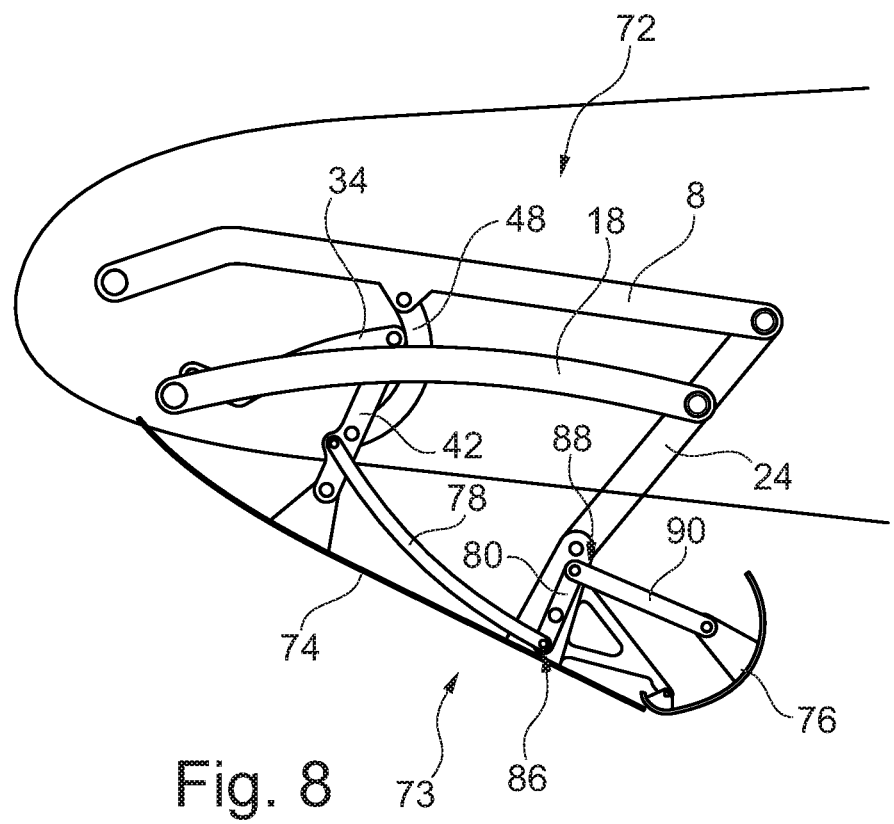
FIG. 8 shows a full side view of the flap system of FIG. 7 in a partially extended position.

In FIG. 7, the flap system 72 is in a retracted position, with the nose part 76 in a compacted, folded form. In FIG. 8, the flap is slightly extended, wherein the third connecting link 78 is pulled to the second connecting link 42, such that the fourth connecting link 90 is pushed outwardly.

Figure 9:
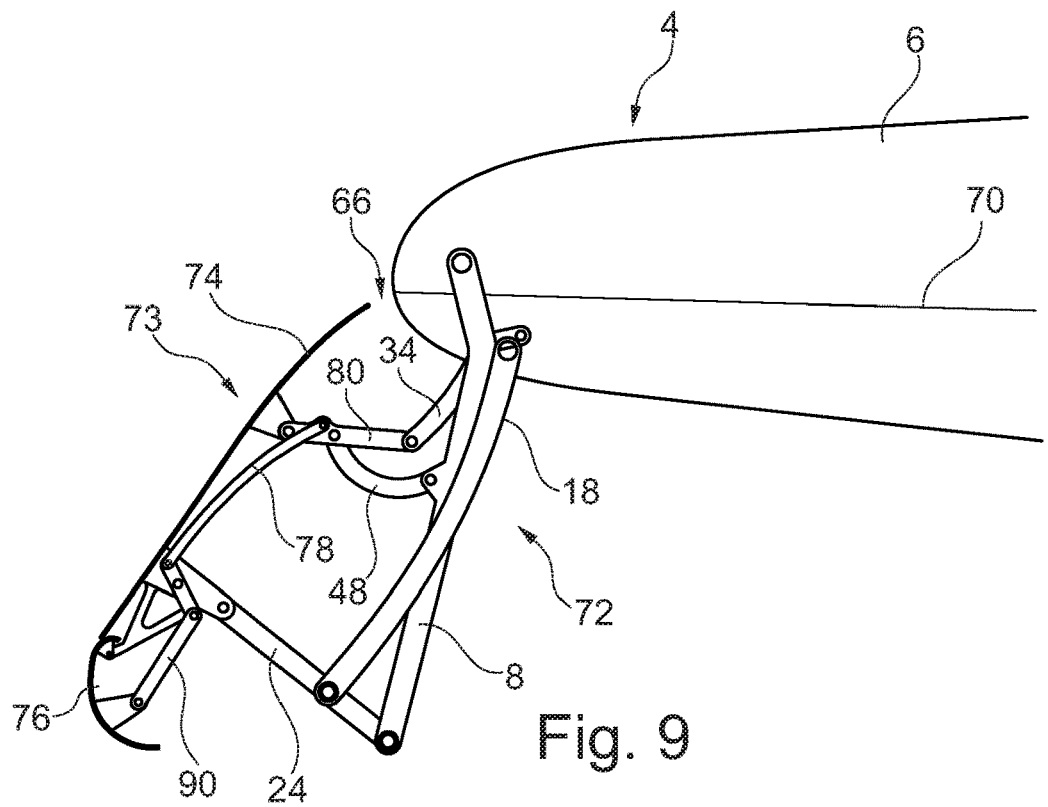
FIG. 9 shows a full side view of the flap system of FIG. 8 in a further extended position.

In FIG. 9, the flap is almost extended to the desired angle of approximately 117° at an intermediate position, in which the flap 73 is just below the wing chord line.

Figure 10:
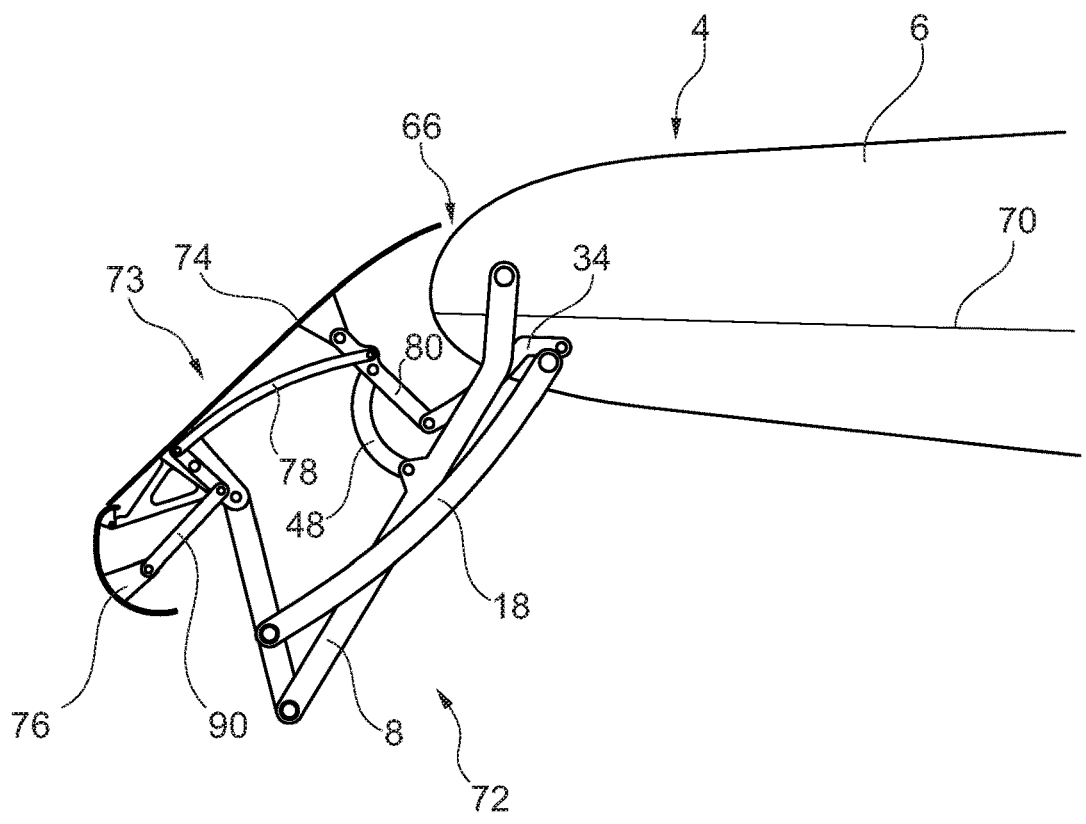
FIG. 10 shows a full side view of the flap system of FIG. 1 in a fully extended position.

In FIG. 10 the flap 73 is shown after a subsequent substantially parallel motion, where the flap 73 reaches an angle of about 130°. This is comparable to the illustrations in FIGS. 3 and 4 regarding the first exemplary embodiment. The position shown in these figures is the extended position.

Figure 11:
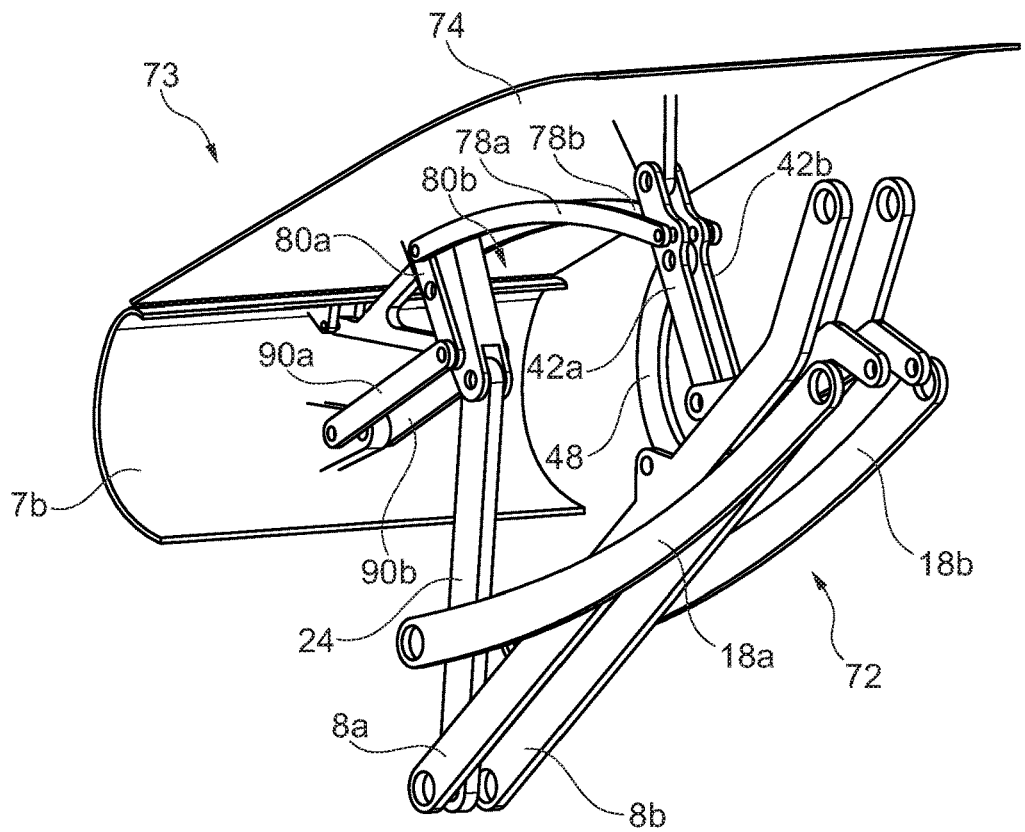
FIG. 11 shows a rear perspective view of the flap system of FIG. 7.
Figure 12:
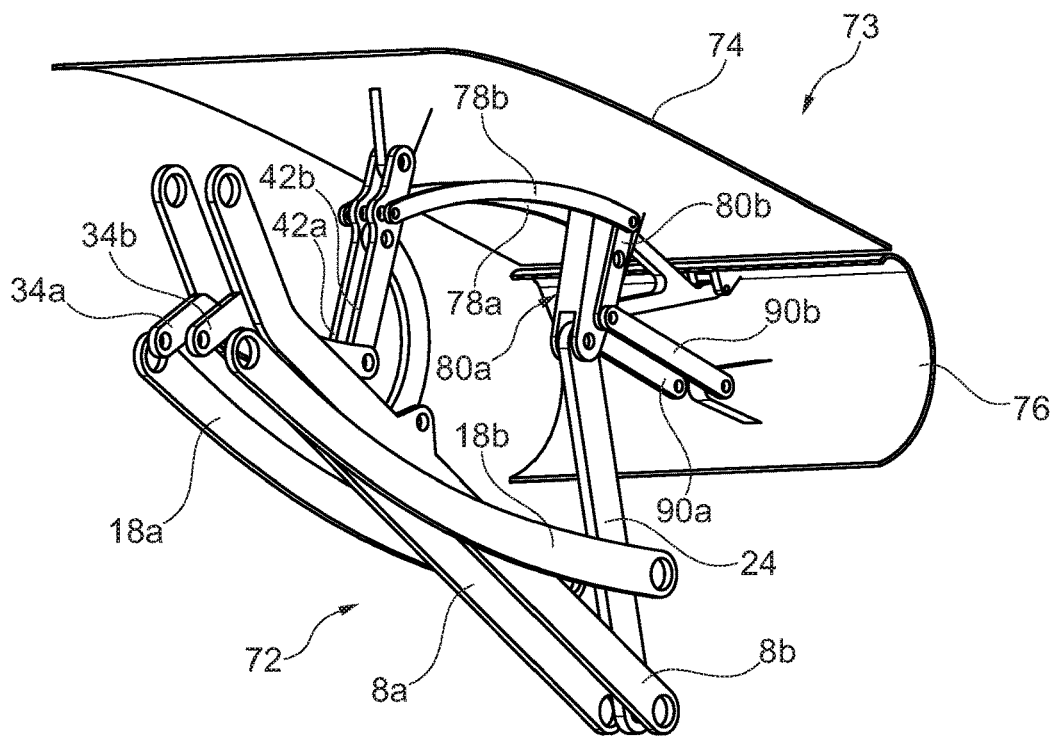
FIG. 12 shows a front perspective view of the flap system of FIG. 7.

Still further, FIGS. 11 and 12 show the flap system 72 in a three-dimensional view. Here, the fourth connecting link and the second auxiliary link are shown as doubled links. The same applies to the third connecting link 78.

Figure 13:
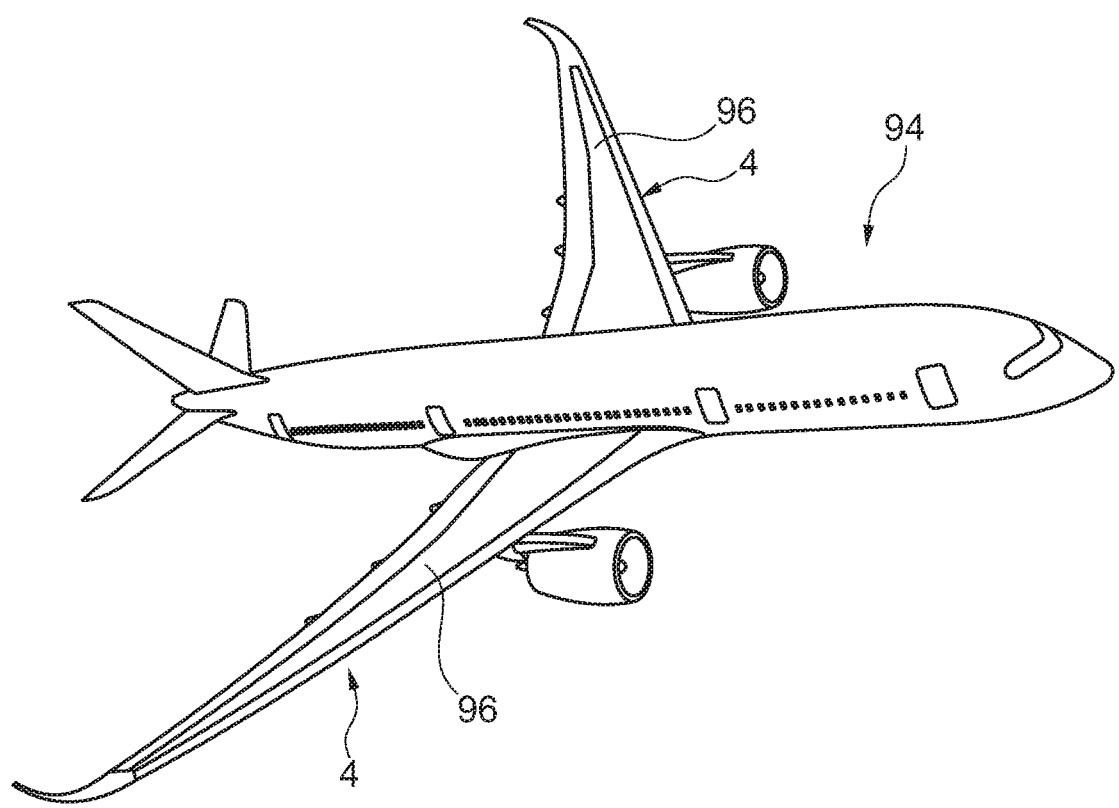
FIG. 13 shows an aircraft having wings comprising at least one flap system according to the invention.

Finally, FIG. 13 shows an aircraft 94 having two wings 96, to which such a flap system 2 or 72 may be installed at a leading-edge region 4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a," "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flap system for driving a leading-edge flap between a retracted position and an extended position, the flap system comprising:
    a leading-edge flap,
    an actuator,
    a first fixed link,
    a second fixed link,
    a third fixed link,
    a first connecting link,
    a second connecting link, and
    an auxiliary link,
    wherein the first fixed link comprises a first support joint for rotatably supporting the first fixed link on a first structurally fixed point,
    wherein the second fixed link comprises a second support joint for rotatably supporting the second fixed link on a second structurally fixed point,
    wherein the third fixed link comprises a third support joint for rotatably supporting the third fixed link on a third structurally fixed point,
    wherein the first fixed link comprises a first connecting joint coupled with an end of the first connecting link, which is coupled with a first flap joint at another end,
    wherein the second fixed link comprises a second connecting joint rotatably coupled with a central region of the first connecting link,
    wherein the third fixed link comprises a third connecting joint rotatably coupled with an end of the second connecting link, which is coupled with a second flap joint at another end,
    wherein the second connecting link is coupled with the first fixed link through the auxiliary link, each at positions inside of the respective ends, and
    wherein the first, second and third fixed links, the first and second connecting links and the auxiliary link are arranged to actively place the leading-edge flap from a retracted position into an extended position.

2. The system of claim 1, wherein the first fixed link has a length greater than the second fixed link.

3. The system of claim 1, wherein in the retracted position the first fixed link and the second fixed link enclose an angle of less than 10°.

4. The system of claim 1, wherein in the retracted position the first connecting link and the first fixed link enclose an angle in a range of 25° to 45°.

5. The system of claim 1, wherein the third fixed link has a length that is half the length of the first fixed link, at a maximum.

6. The system of claim 1, wherein the first, second and third fixed links, the first and second connecting links and the auxiliary link are arranged to actively place the leading-edge flap from a retracted position into an intermediate position, in which a chord axis of the flap is adjusted to a desired angle, and to provide a translational motion afterwards along the chord axis of the flap, while an orientation of the chord axis substantially remains constant.

7. The system of claim 1,
    wherein the leading-edge flap comprises a body part and a nose part,
    further comprising a third connecting link, a second auxiliary link and a fourth connecting link,
    wherein the second connecting link is coupled with an end of the third connecting link, wherein the third connecting link is coupled with the second auxiliary link at an opposed end,
    wherein a center region of the second auxiliary link is swivably supported on the first flap joint and is coupled with the third connecting link at one end and the fourth connecting link at an opposed end, and
    wherein the flap nose part is coupled with the fourth connecting link and the first flap joint.

8. The system of claim 1, wherein only a single actuator is used.

9. A wing having a leading-edge region and a trailing edge region, as well as at least one system according to claim 1 installed inside the wing.

10. The wing according to claim 9, wherein the system is arranged in the leading-edge region.

11. The wing according to claim 9, wherein the system is configured to move the flap below a wing leading edge up to an angle of 117° between a local flap chord and a local wing chord.

12. The wing according to claim 9, wherein the flap system is further configured to limit a gap between a trailing edge of the flap and a leading-edge of the wing to 2% of the local wing chord.

13. An aircraft having at least one wing according to claim 9.

* * * * *